United States Patent Office 3,769,282
Patented Oct. 30, 1973

3,769,282
1,4,2-DIOXAZINE DERIVATIVES AND PREPARATION
Amedeo Omodei-Sale and Pietro Consonni, Milan, Italy, assignors to Gruppo Lepetit S.p.A., Milan, Italy
No Drawing. Filed Apr. 26, 1972, Ser. No. 247,824
Claims priority, application Italy, Apr. 29, 1971, 23,848/71
Int. Cl. C07d 87/00
U.S. Cl. 260—244 R                    6 Claims

ABSTRACT OF THE DISCLOSURE

The compounds of this invention are 1,4,2-dioxazine derivatives of the formula

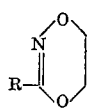  (I)

R is hydrogen, 1 to 10 carbon alkyl, 3 to 6 carbon cycloalkyl, 2 to 4 carbon alkenyl, benzyl, lower alkoxy substituted benzyl, lower alkoxy substituted phenyl, styryl, lower alkoxy substituted styryl, pyridyl, lower alkoxy substituted pyridyl, $\alpha,\alpha$ - dimethyl-3,4-methylenedioxybenzyl or naphthyl group.

The compounds of this invention are prepared by reacting an acyl halide or an anhydride of the formula R—COX or (RCO)$_2$  (II)

wherein X is halogen or OCCO-lower alkyl and R has the meaning given above with a haloethylhydroxylamine of the formula NH$_2$—OCH$_2$—CH$_2$-halo  (III)

in the presence of an acid acceptor such as, for example, a tertiary amine to obtain an N-acyl-O-(6-haloethyl)-hydroxylamine of the formula R—CONHOCH$_2$—CH$_2$-halo  (IV)

wherein R has the meaning given above and in reacting the compound of Formula IV with a strong base such as, for instance, an alkali metal salt of a lower alkanol, an alkali metal hydride, an alkali metal salt of hydrocarbon or an alkali metal amide in a suitable inert organic solvent to form the 1,4,2-dioxazine derivative. The compounds of the invention have central nervous system activity.

SUMMARY OF THE INVENTION

This invention relates to a new class of compounds and to a method for preparing them. More particularly, the compounds of this invention are 1,4-2-dioxazine derivatives of the formula

  (I)

wherein R represents hydrogen, 1 to 10 carbon alkyl, 3 to 6 carbon cycloalkyl, 2 to 4 carbon alkenyl, benzyl, lower alkoxy substituted benzyl, lower alkoxy substituted phenyl, styryl, lower alkoxy substituted styryl, pyridyl, lower alkoxy substituted pyridyl, $\alpha,\alpha$-dimethyl-3,4-methylenedioxybenzyl or naphthyl group and wherein "lower alkoxy" has an aliphatic alkyl group of from 1 to 4 carbon atoms and in which there is a maximum of three alkoxy groups on the aromatic ring. A preferred group of compounds comprises those compounds of Formula I wherein R represents a methyl, ethyl, 1-butylphenyl, cyclopropyl, isobutenyl, benzyl, 3,4,5-trimethoxybenzyl, 3,4,5-trimethoxystyryl, $\alpha,\alpha$ - dimethyl-3,4-methylenedioxybenzyl, 2,6-dibutoxy-4-pyridyl or 3,4,5-trimethoxyphenyl.

The process for preparing the compounds of this invention consists in mixing substantially equimolar proportions of an acyl halide or an anhydride of the formula R—COX or (RCO)$_2$O  (II)

wherein X is halo(chloro or bromo) or OCOO-lower alkyl and R has the meaning given above with a haloethylhydroxylamine of the formula NH$_2$—OCH$_2$—CH$_2$-halo  (III)

wherein halo is chloro or bromo at from about 0° to about 50° C. in the presence of a tertiary amine acid acceptor to obtain an N-acyl-O-($\beta$-haloethyl)-hydroxylamine of the formula R—CONHOCH$_2$—CH$_2$-halo wherein R and halo have the meaning given above and in reacting the latter by mixing it with a strong base such as, for instance, an alkali metal salt of a lower alkanol, an alkali metal hydride, an alkali metal salt of a hydrocarbon or an alkali metal amide in a suitable inert organic solvent to give the 1,4,2-dioxazine derivative. A preferred group of solvents comprises 1 to 4 carbon alkanols and 1 to 4 carbon alkyl substituted 2 to 4 carbon acyl amides. The reaction scheme is represented by the following equation:

RCOX + NH$_2$—OCH$_2$—CH$_2$—halo ⟶
(II)            (III)

RCONHOCH$_2$CH$_2$—halo ⟶ 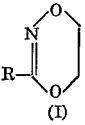
(IV)                              (I)

wherein R and X have the significance given above. According to a preferred method for carrying out the process, the acyl halide or anhydride is mixed with the selected haloethylhydroxylamine in substantially equimolar proportions in the presence of a halogenated solvent as reaction medium, preferably methylene chloride, at a temperature range varying between from about 0° C. to about 50° C. from about 0.5 to about 24 hours, in the presence of about one to two molar proportions of an acid acceptor, advantageously triethylamine.

The so-obtained N-acyl-O-($\beta$-haloethyl)hydroxylamine is cyclized to give the compounds of this invention by mixing therewith an alkali metal salt of a lower alkanol or other strong base in substantially equimolecular proportions, advantageously using as a solvent a similar 1 to 4 carbon alkanol at a temperature range between about room temperature and about the reflux temperature of the solvent for a period of time between about half an hour and about 4 hours. The compounds of the invention have a central nervous system (CNS) activity. Their action on the central nervous system is essentially depressant. For example, impairment of motor coordination and of the righting reflex are observed when the compounds of this invention are administered to mice. In representative experiments, amounts from about 50 mg./kg. to about 100 mg.kg. i.p. of the compounds of this invention were found to be effective as such CNS depressants. The favorable biological characteristics of the compounds of this invention are generally coupled with a low toxicity, since the LD$_{50}$ in mice is generally higher than 500 mg./kg. i.p. For example, the compound 3-(3,4,5-trimethoxyphenyl)-5,6-dihydro-1,4,2-dioxazine has an ED$_{50}$ value of about 100 mg./kg. i.p. in mice in impairing motor coordination and an ED$_{50}$ value of about 60 mg/kg. i.p. in mice in impairing the righting reflex according to the Irwing method (Psychopharmacologia, 13, 222, 1968). The value of the LD$_{50}$ of this compound is about 1000 mg./kg. i.p.

The preferred routes of administration of these compounds are per os and intraperitoneal; however other usual administration routes may be employed. The compounds of this invention are embodied in pharmaceutical dosage forms as tablets, capsules, elixirs, solutions and the like for oral administration. The dosage unit may contain the usual excipients such as, for example, starch, gums, alcohols, sugars, fatty acids, etc. The intraperitoneal route of administration utilizes aqueous parenteral solutions, admixed with conventional antioxidant, preservative, chelating and buffering agents such as, for example, sodium formaldehyde sulfoxylate, benzyl alcohol, ethylenediaminetetraacetic acid derivatives, sodium acetate, and the like. The dosage ranges from about 0.05 to about 1 gram per day, preferably administered in divided doses.

The following non-limitative examples describe in detail representative compounds of this invention and methods for their preparation.

EXAMPLE 1

3-methyl-5,6-dihydro-1,4,2-dioxazine

To a solution of 7.9 g. of 1-chloro-2-aminoxyethane hydrochloride (0.06 mole) in 265 ml. of methylene chloride and containing triethylamine (0.132 g. mole), a solution of 4.3 ml. of acetyl chloride (0.06 g. mole) in 80 ml. of CH$_2$Cl$_2$ is added. The mixture is stirred at room temperature for 7 hours and the solvent is then distilled off in vacuo. The residue is dissolved in anhydrous diethyl ether and filtered. The resulting solution is evaporated to dryness to give 3.25 g. (100%) of N-acetyl-O-($\beta$-chloroethyl)hydroxylamine.

A solution of 0.0104 g. mole of potassium ethoxide in ethanol is added to a solution of 1.43 g. of N-acetyl-O-($\beta$-chloroethyl)hydroxylamine (0.0104 mole) in 73 ml. of dimethoxyethane. The mixture is stirred and evaporated to dryness in vacuo without heating. The resulting solid residue is dissolved in 52 ml. of acetonitrile and refluxed for 1 hour. The mineral acid salts are filtered off and acetonitrile is distilled off, yielding 0.42 g. (40%) of 3-methyl-5,6-dihydro-1,4,2-dioxazine; B.P. 80°–90° C./10 mm. Hg.

EXAMPLE 2

3-ethyl-5,6-dihydro-1,4,2-dioxazine

To a solution of 5.24 g. of 1-chloro-2-aminoxyethane hydrochloride (0.04 mole) in 120 ml. of methylene chloride and containing triethylamine (0.088 mole), 3.5 ml. of propionyl chloride (0.04 g. mole) in 80 ml. of CH$_2$Cl$_2$ is added. The mixture is stirred at room temperature for 4 hours and the solvent is then distilled off in vacuo. The residue is dissolved in benzene and washed twice with an aqueous solution saturated with NaCl to give 4 g. (67.4%) of N-propionyl-O-($\beta$-chloroethyl)hydroxylamine.

N-propionyl-O-($\beta$-chloroethyl)hydroxylamine is also prepared from the corresponding anhydride, as follows. To a solution of 4.45 g. of propionic acid (0.06 mole) in 145 ml. of CH$_2$Cl$_2$ containing triethylamine (0.06 g. mole), a solution of 5.7 ml. of ethyl chlorocarbonate (0.06 g. mole), in 24 ml. of CH$_2$Cl$_2$ is added at 0° C. The same temperature is maintained for half an hour with stirring and a solution of 7.9 g. of 1-chloro-2-aminooxyethane hydrochloride (0.06 mole) in 260 ml. of CH$_2$Cl$_2$ containing triethylamine (0.132 g. mole) is added. The mixture is maintained for half an hour at 0° C. with stirring then at room temperature for 4 hours. The solvent is removed by distillation in vacuo without heating; the so-dried residue is dissolved in benzene and washed twice with an aqueous solution saturated with NaCl. After drying over Na$_2$SO$_4$ and evaporating to dryness, there is obtained 5.2 g. of N-propionyl-O-($\beta$-chloroethyl)hydroxylamine.

To a solution of 0.031 g. mole of sodium ethoxide in 100 ml. of ethanol, a solution of 4.7 g. of N-propionyl-O-($\beta$-chloroethyl)hydroxylamine (0.031 mole) in 43 ml. of ethanol is added. After refluxing for 45 minutes, the solvent is distilled off in vacuo. The residue is dissolved in ethyl ether and distilled to give 2.05 g. (57.5%) of the title product, B.P. 120° C./50 mm. Hg.

EXAMPLE 3

3-cyclopropyl-5,6-dihydro-1,4,2-dioxazine

To a solution of 6.62 g. of 1-chloro-2-aminoxyethane hydrochloride (0.05 mole) in 150 ml. of CH$_2$Cl$_2$ and 5.2 g. of cyclopropylcarbonyl chloride (0.05 mole) a solution of 0.13 g. mole of triethylamine in 50 ml. of CH$_2$Cl$_2$ is added. The mixture is stirred for 4 hours at room temperature and the solvent is then distilled off in vacuo. The residue is dissolved in 100 ml. of benzene and washed twice with saturated aqueous NaCl. The organic layer is dried and the benzene distilled off. The residue is recrystallized from diisopropyl ether to give 4.85 g. (59.5%) of N - cyclopropylcarbonyl-O-($\beta$-chloroethyl)hydroxylamine, melting at 75°–76° C.

To a solution of 0.0287 mole of sodium ethoxide in 122 ml. of ethanol, 4.7 g. of N-cyclopropylcarbonyl-O-($\beta$-chloroethyl)hydroxylamine (0.0287 mole) is added and the mixture is refluxed for half an hour to a final pH of about 6.5. After removal of the solvent by distillation in vacuo, the residue is dissolved in CH$_2$Cl$_2$ and washed twice with aqueous saturated NaCl. The organic layer is drid over Na$_2$SO$_4$ and distilled to dryness to give 2.35 g. of the title product, B.P. 115°–125° C./15 mm. Hg.

EXAMPLE 4

3-isobutenyl-5,6-dihydro-1,4,2-dioxazine

To a solution of 6 g. of 3-methylcrotonic acid (0.06 mole) in 145 ml. of CH$_2$Cl$_2$ and 9.25 ml. of triethylamine (0.06 g. mole) at 0° C., a solution of 5.7 ml. of ethyl chlorocarbonate (0.06 g. mole) in 24 ml. of CH$_2$Cl$_2$ is added. The temperature is maintained at 0° C. for half an hour, then 7.9 g. of 1-chloro-2-aminoxyethane hydrochloride (0.06 mole) in 260 ml. of CH$_2$Cl$_2$ and 18.5 ml. of triethylamine (0.132 g. mole) are added. The mixture is maintained at 0° C. for half an hour, then at room temperature for 4 hours. The solvent is then distilled off in vacuo without heating, and the residue is dissolved in benzene and washed twice with aqueous saturated NaCl. After drying over Na$_2$SO$_4$, the solvent is evaporated, and the product is recrystallized from diisopropyl ether to give 2.7 g. (25.4%) of N-(3-methylcrotonyl)-O-($\beta$-chloroethyl)hydroxylamine, M.P. 60°–70° C.

To a solution of 0.052 g. mole of sodium ethoxide in 65 ml. of ethanol is added 2.7 g. of N-(3-methylcrotonyl)-O-($\beta$-chloroethyl)hydroxylamine (0.0152 mole). The mixture is refluxed for 45 minutes to a final pH of about 8. After evaporation of the solvent in vacuo, the dried residue is dissolved in CH$_2$Cl$_2$ and washed twice with H$_2$O. The resulting solution is dried over Na$_2$SO$_4$ and the solvent evaporated to give 1.6 g. (74.6%) of the title product; B.P. 80° C./0.1 mm. Hg.

EXAMPLE 5

3-(1-butylpentyl)-5,6-dihydro-1,4,2-dioxazine

To a solution of 5.25 g. of 1 - chloro - 2-aminoxyethane hydrochloride (0.04 mole) in 110 ml. of CH$_2$Cl$_2$ and 12.8 ml. of triethylamine, a solution of 7.65 g. of 2-butylcaproyl chloride (0.04 mole) in 80 ml. of CH$_2$Cl$_2$ is added at room temperature. The mixture is stirred for 4 hours, then washed with 80 ml. of aqueous 5% HCl, 50 ml. of aqueous 8% NaHCO$_3$ and 50 ml. of H$_2$O. The organic phase is dried over Na$_2$SO$_4$ and dried in vacuo; yield: 9.6 g. (96.3%).

To 0.0385 g. mole of sodium ethoxide in 120 ml. of ethanol, a solution of 9.6 g. of N-(2-butylcaproyl)-O-($\beta$-chloroethyl)hydroxylamine (0.0385 mole) in 40 ml. of ethanol is added and refluxed for 45 minutes to a final pH of about 7.5. After distillation of the solvent in vacuo, the residue is taken up with $CH_2Cl_2$ and washed to neutrality with $H_2O$. The solution is dried over $Na_2SO_4$ and evaporated to dryness to give 5.4 g. (66%) of the title product; B.P. 85° C./0.05 mm. Hg.

EXAMPLE 6

3-benzyl-5,6-dihydro-1,4,2-dioxazine

To 14.7 g. of 1-chloro-2-aminoxyethane hydrochloride (0.113 mole) in 250 ml. of $CH_2Cl_2$ and 15.8 g. of phenacetyl chloride (0.102 mole), 35 ml. of triethylamine (0.25 g. mole) in 150 ml. of $CH_2Cl_2$ is added at room temperature. The mixture is stirred for 4 hours, washed with aqueous 5% HCl, with aqueous 8% $NaHCO_3$ and finally with $H_2O$. After drying over $Na_2SO_4$ and evaporating to dryness, 16.65 g. (76.5%) of N-phenacetyl-O-(β-chloroethyl)hydroxylamine is obtained.

To 0.065 mole of sodium ethoxide in 250 ml. of ethanol, a solution of 14 g. of N-phenacetyl-O-(β-chloroethyl)hydroxylamine (0.65 mole) in 50 ml. of ethanol is added and refluxed for 45 minutes to a pH of about 8. After evaporation of the solvent, the residue is dissolved in ethyl ether and washed to neutrality with $H_2O$. The organic solution is dried over $Na_2SO_4$ and evaporated to dryness to give 4.4 g. of the title product; B.P. 105° C./0.1 mm. Hg.

EXAMPLE 7

3-(3,4,5-trimethoxybenzyl)-5,6-dihydro-1,4,2-dioxazine

To 3.9 g. of 1-chloro-2-aminoxyethane hydrochloride (0.022 mole) in 60 ml. of $CH_2Cl_2$ and 7 ml. of triethylamine (0.05 mole) a solution of 6.15 g. of 3,4,5-trimethoxyphenylacetyl chloride in 45 ml. of $CH_2Cl_2$ is added at room temperature. After stirring for 15 hours, the solution is washed with 30 ml. of aqueous 5% HCl, 50 ml. of aqueous 8% sodium bicarbonate solution and 50 ml. of $H_2O$. The organic phase is dried over $Na_2SO_4$ and evaporated in vacuo. The solid residue, 7.95 g., is recrystallized from 30 ml. of ethyl acetate to give 3.85 g. (57.7%) of intermediate N-3,4,5-trimethoxybenzyl-O-(β-chloroethyl)hydroxylamine, M.P. 1030–104° C. To 0.011 mole of sodium ethoxide in 39 ml. of ethanol, 3.35 g. of N - 3,4,5 - trimethoxybenzyl - O-(β-chloroethyl) hydroxylamine (0.011 mole) is added and refluxed for 45 minutes. After elimination of the solvent in vacuo, the residue is dissolved in $CH_2Cl_2$ and washed to neutrality with $H_2O$. The organic layer is dried over $Na_2SO_4$ and after evaporation of the solvent the residue is distilled to give 2.25 g. of the title product, boiling at 180° C./0.1 mm. Hg.

EXAMPLE 8

3-(3,4,5-trimethoxystyryl)-5,6-dihydro-1,4,2-dioxazine

To 7.2 g. of 3,4,5-trimethoxycinnamic acid (0.03 mole) in 120 ml. of $CH_2Cl_2$ and 4.25 ml. of triethylamine (0.03 g. mole), a solution of 2.85 ml. of ethyl chlorocarbonate (0.03 g. mole) in 12 ml. of $CH_2Cl_2$ is added at 0° C. After stirring for half an hour at 0° C., a solution of 4 g. of 1-chloro-2-aminoxyethane hydrochloride , (0.03 mole) in 140 ml. of $CH_2Cl_2$ containing 9.5 ml. of triethylamine (0.066 mole) is added. Stirring is continued for 30 minutes at 0° C. then at room temperature for 3 to 4 hours. After washing with aqueous 5% HCl, with aqueous 8% $NaHCO_3$ and with $H_2O$, the solution is dried over $Na_2SO_4$ and the solvent is evaporated. The residue is crumbled in diisopropyl ether to give N-(3,4,5-trimethoxy) - cinnamyl - O - (β-chloroethyl)hydroxylamine, 6.9 g., which melts at 131°–132° C. after crystallization from ethanol. To 0.012 mole of sodium ethoxide in 62 ml. of ethanol, 3.8 g. of N-(3,4,5-trimethoxy)-cinnamyl - O - (β - chloroethyl)hydroxylamine (0.012 mole) is added and refluxed for 30 minutes to a final pH of about 7. The solvent is evaporated in vacuo and the residue is dissolved in $CH_2Cl_2$ and washed twice with $H_2O$. The resulting solution is dried over $Na_2SO_4$ and after evaporation of solvent 3.3 g. of crude product is obtained which, when crystallized from 50 ml. of methanol, melts at 156°–157° C. to give 2.45 g. (73%) of the title product.

EXAMPLE 9

3-(α,α-dimethyl-3,4-methylenedioxybenzyl)-5,6-dihydro-1,4,2-dioxazine

To 20 g. of (3,4-methylenedioxyphenyl)acetonitrile (0.123 mole) in 400 ml. of dimethylformamide, 7.5 g. of 80% sodium hydride (0.25 mole) is added. The mixture is stirred at room temperature until the sodium hydride is wholly reacted (about 2 hours), then 40 ml. of methyl iodide (0.64 mole) is added and stirring is continued for 15 hours at room temperature, then for 5 hours at 50° C. After further addition of 2.5 g. of 80% NaH (0.083 mole) and 20 ml. of methyl iodide (0.33 mole), the mixture is left to stand overnight. It is poured into two liters of $H_2O$ and extracted twice with ethyl ether. The ether solution is washed twice with $H_2O$, dried over $Na_2SO_4$ and evaporated to dryness. The residue is distilled, yielding 18.8 g. (80.7%), B.P. 120° C./0.07 mm. Hg, of α,α-dimethyl-(3,4-methylenedioxyphenyl) acetonitrile.

To 17.1 g. of the latter in 48 ml. of ethanol, a solution of 0.9 g. of 97% NaOH in 16 ml. of $H_2O$ and containing 32 ml. of 35% $H_2O_2$ is added. The mixture is then stirred at room temperature for half an hour and at 55° C. for 4 hours. Without cooling, 19.5 ml. of aqueous 5% $H_2SO_4$ is added and, after stirring for one hour, the mixture is allowed to stand overnight to give 9 g. (48.3%) of α,α - dimethyl-(3,4-methylenedioxyphenyl)acetamide, melting at 153°–155° C. (from ethanol).

To 6 g. of the last named compound (0.029 mole) in 35 ml. of acetic acid, 10.1 ml. of amyl nitrite (0.0755 mole) is added at room temperature under a slight stream of dry hydrogen chloride. After stirring for 2 hours at room temperature and heating to 95° C. for an additional 2 hours, the residue obtained by removal of the solvent is taken up with 100 ml. of aqueous 8% $NaHCO_3$ solution and washed with ethyl ether. The aqueous solution is acidified with dilute aqueous hydrogen chloride and the resulting precipitate is recovered by filtration. Recrystallization from hexane yields 3.5 g. (80.5%) of α,α-dimethyl - (3,4 - methylenedioxyphenyl)-acetic acid; M.P. 111°–112° C. 2.75 grams of α,α-dimethyl-(3,4-methylene dioxyphenyl)acetic acid in 28 ml. of $CHCl_3$ containing 6 ml. of $SOCl_2$ is refluxed for 2 hours. After evaporation of the solvent in vacuo, the crude product is taken up in $CH_2Cl_2$ to give 3 g. of α,α-dimethyl-(3,4-methylenedioxyphenyl)acetyl chloride.

To 1.8 g. of 1-chloro-2-aminoxyethane hydrochloride (0.0136 mole) and 4.25 ml. of triethylamine (0.03 mole) in 36 ml. of methylene chloride, a solution of 3 g. of α,α-dimethyl-(3,4-methylenedioxyphenyl)acetyl chloride in 25 ml. of $CH_2Cl_2$ is added. After stirring for 4 hours at room temperature, the solution is washed with 5% aqueous HCl, with aqueous 8% $NaHCO_3$ and with $H_2O$. The solution is dried and the solvent evaporated to give 3.9 g. (100%) of N-[α,α-dimethyl-(3,4-methylenedioxyphenyl)acetyl]-O-(β-chloroethyl)hydroxylamine.

To 0.0105 g. mole of sodium ethoxide in 35 ml. of ethanol, a solution of 3 g. of N-[α,α-dimethyl-(3,4-methylenedioxyphenyl)acetyl] - O - (β-chloroethyl)hydroxylamine in 20 ml. of ethanol is added and is refluxed for 45 minutes. The solvent is driven off in vacuo, and the remaining oil is taken up in $CH_2Cl_2$ and washed three times with $H_2O$. After removal of the dichloromethane, the residue is crystallized from 20 ml. of diisopropyl ether to give 1.3 g. (50%) of the title product, M.P. 93°–94° C.

EXAMPLE 10

3-(3,4,5-trimethoxyphenyl)-5,6-dihydro-1,4,2-dioxazine

This compound is prepared according to the process described in Example 7, but using as the starting compounds 3,4,5-trimethoxybenzoyl chloride, and 1-chloro-2-aminoxyethane hydrochloride. Yield 60%. M.P. 92°–93° C. (from diisopropylether).

EXAMPLE 11

3-(1-naphthyl)-5,6-dihydro-1,4,2-dioxazine

This compound is prepared according to the procedure of Example 7, employing as the starting substances 1-naphthoyl chloride and 1-chloro-2-aminoxyethane hydrochloride. Yield 82%. B.P. 165° C./0.07 mm. Hg.

EXAMPLE 12

3-(2,6-dibutoxy-4-pyridyl)-5,6-dihydro-1,4,2-dioxazine

The title compound is prepared according to the procedure of Example 7, starting from 2,6-dibutoxy-4-pyridyl-carboxylic acid chloride and 1-chloro-2-aminoxyethane hydrochloride. Yield 51.2%. B.P. 170° C./0.03 mm. Hg.

What is claimed is:

1. A compound represented by the formula

in which R is selected from the group consisting of hydrogen, 1 to 10 carbon alkyl, 3 to 6 carbon cycloalkyl, 2 to 4 carbon alkenyl, benzyl, lower alkoxy substituted benzyl, lower alkoxy substituted phenyl, styryl, lower alkoxy substituted styryl, pyridyl, lower alkoxy substituted pyridyl, α,α-dimethyl-3,4-methylenedioxybenzyl or naphthyl, and wherein the aliphatic alkyl group of the lower alkoxy radical contains from 1 to 4 carbon atoms and in which there is a maximum of three alkoxy groups on a given aromatic ring.

2. A compound of claim 1 wherein R is selected from the group consisting of methyl, ethyl, cyclopropyl, isobutenyl, 1-butylpentyl, benzyl, 3,4,5-trimethoxybenzyl, 3,4,5-trimethoxystyryl, α,α-dimethyl-3,4-methylenedioxybenzyl, naphthyl, 3,4,5-trimethoxyphenyl and 2,6-dibutoxypyridyl.

3. A compound of claim 1 wherein R is 3,4,5-trimethoxy-phenyl.

4. A process for the preparation of a 5,6-dihydro-1,4,2-dioxazine represented by the formula

wherein R is selected from the group consisting of hydrogen, 1 to 10 carbon alkyl, 3 to 6 carbon cycloalkyl, 2 to 4 carbon alkenyl, benzyl, lower alkoxy substituted benzyl, lower alkoxy substituted phenyl, styryl, lower alkoxy substituted styryl, pyridyl, lower alkoxy substituted pyridyl, α,α-dimethyl-3,4-methylenedioxybenzyl or naphthyl and wherein the aliphatic alkyl group of the lower alkoxy radical contains from 1 to 4 carbon atoms and in which there is a maximum of three alkoxy groups on a given aromatic ring, which comprises mixing substantially equimolar proportions of a compound of the formula RCOX, in which R has the same meaning as above and X is selected from the group consisting of halo and OCOO-lower alkyl, with a 1-halo-2-aminoxyethane represented by the formula $NH_2-O-CH_2-CH_2$-halo in the presence of a halogenated hydrocarbon as a solvent and a tertiary amine as an acid acceptor, at a temperature between about 0 and about 50° C., and mixing at reflux temperature the resulting N-acyl-O-(β-haloethyl)hydroxylamine with a substantially equimolar proportion of a strong base of the group consisting of alkali metal alcoholates, alkali metal hydrides, hydrocarbyl alkali metals and alkali metal amides in the presence of an inert organic solvent to give the said 5,6-dihydro-1,4,2-dioxazine.

5. A process according to claim 4 wherein the strong base is sodium or potassium ethoxide and the inert organic solvent is a lower alkanol or a lower alkyl lower acyl amide.

6. A process according to claim 4, wherein the cyclization step is carried out at the boiling temperature of the organic solvent.

References Cited

Johnson et al.: J. Org. Chem., vol. 36, pp. 284–94 (January 1971).

HARRY I. MOATZ, Primary Examiner

U.S. Cl. X.R.

260—240 D, 293.86, 340.3, 468 R, 469, 478; 424—248

FORM O-1050
(5/69)

UNITED STATES PATENT OFFICE
CERTIFICATE OF CORRECTION

Patent No. 3,769,282          Dated October 30, 1973

Inventor(s) Amedeo Omodei-Sale and Pietro Consonni

It is certified that error appears in the above-identified patent and that said Letters Patent are hereby corrected as shown below:

Column 1, line 70, change "1-butylphenyl" to -- 1-butylpentyl --;

Column 2, line 62, insert a diagonal "/" between mg. and kg.;

Column 3, line 61, delete "g.";

Column 3, line 63, change "amino" to -- amin --;

Column 4, line 28, correct spelling of "dried";

Column 5, line 20, "0.65" should read -- 0.065 --;

Column 5, line 43, "1030" should read -- 103° --;

Column 6, line 17, "0.64 mole" should read -- 0.64 g. mole --;

Signed and sealed this 14th day of January 1975.

(SEAL)
Attest:

McCOY M. GIBSON JR.
Attesting Officer

C. MARSHALL DANN
Commissioner of Patents